May 18, 1926.
K. M. HENRY
1,585,542
PROCESS OF ANNEALING GLASS
Filed Nov. 25, 1924
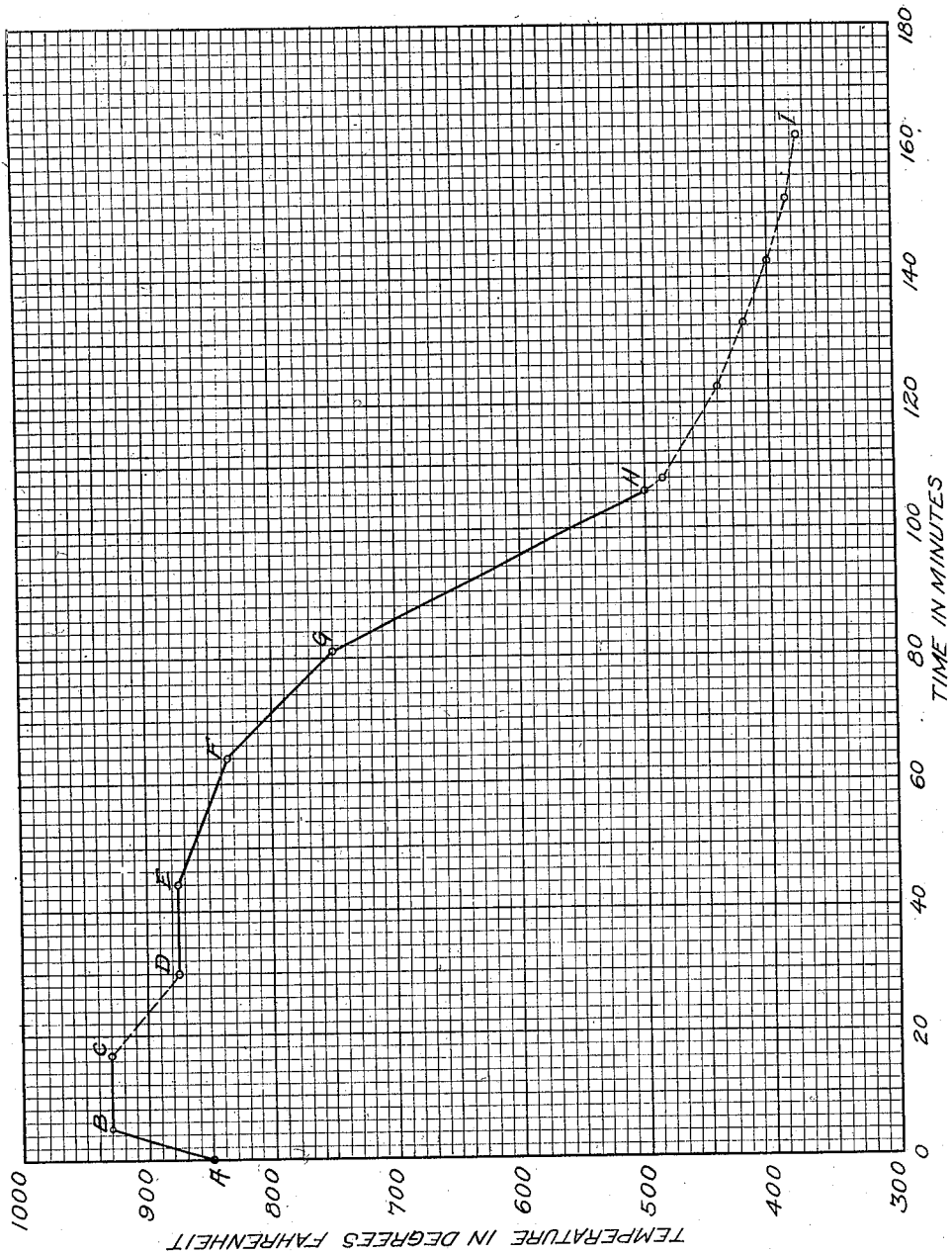
Inventor
Kenneth M. Henry
By Dewey, Strong, Townsend & Hefter
Attorneys.

Patented May 18, 1926.

1,585,542

UNITED STATES PATENT OFFICE.

KENNETH M. HENRY, OF SAN FRANCISCO, CALIFORNIA, ASSIGNOR TO ILLINOIS-PACIFIC GLASS COMPANY, OF SAN FRANCISCO, CALIFORNIA, A CORPORATION OF CALIFORNIA.

PROCESS OF ANNEALING GLASS.

Application filed November 25, 1924. Serial No. 752,110.

This invention relates to the annealing of glass, and more particularly to the art of annealing as carried on in temperature-controlled lehrs or muffles.

The annealing of glass as heretofore carried on has required a great deal of time, and in the case of large bottles, say of five-gallon capacity, it has been practically impossible to properly anneal them in a lehr, resort being had to annealing ovens, where the bottles have to be held for several days.

The object of my invention is to properly anneal glass articles, including large-sized bottles, in a lehr or temperature-controlled muffle, and to shorten the time required by a matter of several hours, or even days, depending on the size and character of the article.

It will be helpful to an understanding of my process to briefly describe some of the terms hereinafter used:

"Annealing temperature" or the upper limit of the "annealing range" is that temperature at which all existing stresses and strains will be eliminated within two minutes after the glass is subjected thereto.

"Annealing range" is a zone of about 270 degrees Fahrenheit below the annealing temperature.

Glass, according to the temperature to which it is subjected exists in three states, namely, "viscous," "plastic," and "elastic."

"Viscous" state is that condition of the glass above the upper limits of the "annealing range" where the relaxation of stresses is instantaneous.

"Plastic" state is that condition of the glass in the annealing range where the relaxation of stresses takes an appreciable length of time.

"Elastic" state is that condition of the glass below the annealing range where the relaxation of stresses takes an infinite length of time.

"Temporary stresses" are those imparted to the glass in the plastic and elastic states. The temporary stress produced by a heating gradient is called a "positive" stress, and that produced by a cooling gradient is called a "reverse" stress.

"Permanent stresses" are those due to the imparting of a temperature gradient while in the viscous state. Permanent stresses may also be formed during the cooling through the annealing range, as explained later.

My experiments have conclusively established that at any temperature below the annealing range, as above defined, it is impossible to impart stress and strain that will affect the ultimate annealing of the glass. Within the annealing range, however, glass can be controlled at will, and all existing stress and strain can be removed, or stress and strain can be imparted that will remain after the annealing is completed.

Furthermore, for the complete removal of all possible stress and strain, temperature and time are correlative factors. At any temperature (within the annealing range) there is a definite time interval necessary for removal of stress and strain, which I shall term the "annealing time." Thus the "annealing time" may consist of a brief period if the temperature maintained be high, or it will be a longer period if the temperature during the same be lower.

When a temperature gradient (rising or falling) is imparted to glass in the viscous state, the molecules are free to move and do move to conform to the temperature gradient without the introduction of stress because of such freedom. After this readjustment, when the glass has cooled and the temperature gradient is removed, this condition is "frozen" and retained in the plastic and elastic states of the glass successively and is a permanent stress and strain. The same result, although partial in degree, may follow from a cooling gradient imparted to the glass in the upper reaches of the plastic states. There is no sharp definition between the plastic and the viscous state, and in the upper reaches of the former, the molecules of glass being somewhat mobile, may partially readjust themselves to conform to a cooling gradient and take on a change that becomes permanent stress and strain when the condition becomes "frozen" by the elastic states of the glass.

The molecular readjustment to which reference has been made is called viscous yielding, or lost motion.

Under prior methods of annealing, these factors have not been properly observed, and it is the usual practice to bring the glass articles to a high temperature where all strains disappear in a reasonably short time, and thereafter slowly and gradually lower the temperature. The temperature at which all the strains disappear within a reasonably short time is so high, particularly in articles like large bottles, that an inordinate length of time is required to cool the articles. Any attempt to accelerate cooling in the upper reaches of the annealing range will cause reverse strains to occur in the glass articles, and result in imperfect annealing.

In and by the present method, instead of accomplishing all of the heating in one stage, as in prior methods, provision is made for carrying on annealing in two or more stages, that is to say, the glass articles are rapidly heated to a relatively high point in the annealing range, bordering on the upper limit of the plastic state and the lower limit of the viscous state. Here the temperature is maintained until all stresses and strains are removed, and then the temperature is rapidly lowered to a point within the annealing range and held there long enough to remove the reverse strains caused by the rapid drop in temperature. Thereafter, cooling can be carried on continuously and with progressively increasing rapidity, until the articles are at a temperature below the annealing range, without danger of imparting reverse strains. Thereby perfect annealing can be effected in a period of three or four hours as against a period of twelve to seventy-two hours under prior practice.

In the accompanying drawing I show a chart illustrating a temperature curve suitable for annealing five-gallon bottles of a particular character of glass. This curve will vary, depending upon the nature of the glass and depending also in some instances upon the shape and size of the article. However, the necessary variations can readily be arrived at by those skilled in the art, by means of preliminary tests.

Glass articles as they issue from the forming machine may be either hotter or colder than the annealing temperature as found for the particular glass under treatment. In either event they are brought rapidly to the proper annealing temperature, which may be the upper limits of the plastic state or lower limits of the viscous state. When the annealing temperature is reached, the heat is held constant until all of the stresses are removed. It follows that the higher the temperature to which glass is heated, the shorter will be the time required to remove the stresses. When the gradients have been removed the glass is cooled rapidly to a temperature lower in the annealing range, and there again held constant for a sufficient period of time to remove the stresses imparted by viscous yielding during the cooling. Any stress that was inadvertently left in the glass at the end of the first annealing period would also be removed at this point. From this point the glass is cooled at a progressively increasing rate, which becomes very rapid as the lower limit of the annealing range is reached. After the lower limit is passed, the cooling may be as rapid as desired, saving only that the temporary stress imparted by the rapid cooling may not be so great as to overcome the tensile strength of the glass and thus result in breakage.

In the foregoing example but two annealing stages are used. This is not in obedience to a set rule, but is governed by the chemical and physical characteristics of the glass. In some glasses more than two stages of annealing may be required before the glass becomes sufficiently immobile and free from lost motion to permit a rapid cooling in the final stages of the process.

As for the theory of the several stages employed, let it be here explained that the constant temperature at the high point in the annealing range would suffice to remove all stresses, but the cooling gradient from that point would necessarily be a slow one and critically controlled within very narrow limits, to avoid introducing strains anew by viscous yielding. On the other hand, annealing only at the lower reaches of the range, whence the risk of new strains would be negligible, would require a time factor that is economically prohibitive. Therefore, my process removes the stresses at a high temperature where the annealing time is short, then cools rapidly to a temperature still within the annealing range, where ordinarily the annealing time would be great, but is moderate on account of the small, regular amount of lost motion engendered by the straight cooling, and from this point the fixed condition of the glass permits of reasonably rapid cooling without danger of appreciable permanent stress and strain.

A specific example of my process as applied to a very heavy bottle made to hold five gallons of liquid content is shown in the accompanying drawing. The vertically spaced lines represent temperature in degrees Fahrenheit, and the horizontally spaced lines time in minutes. Although this type of bottle has been manufactured for many years, it has been impossible to anneal it consistently and properly, on account of its great weight and size. In fact, it is now known that it would not be possible to anneal such a bottle in a lehr with good commercial results without employing the process here disclosed.

These bottles generally reach the annealing apparatus at a temperature below the upper reaches of the annealing range. Immediately upon entering the lehr they are heated rapidly to 930 degrees Fahrenheit, and held at this temperature for twelve minutes. The temperature is then dropped to 875 degrees Fahrenheit as rapidly as the apparatus will permit. They are held at this temperature for a further period of twelve minutes. Successively they are cooled to 835 degrees Fahrenheit at the rate of two degrees per minute, to 750 degrees Fahrenheit at the rate of five degrees per minute, to 500 degrees Fahrenheit at the rate of 10 degrees per minute, and thence to room temperature at will, with due regard for breakage from sudden shock. Due to the necessity for accurate control of temperatures, it is preferable to carry out this process in an electric lehr.

In applying my process to glass of different physical or chemical nature, it is necessary first to determine the proper annealing temperatures and times and the rate of cooling. This may be done by resorting to a few preliminary tests, first to determine the upper limit of the annealing range of the particular glass under consideration. Thereafter various tests are made to determine the temperature and time required for the removal of the maximum stress at different points within the annealing range. From these tests the lowest maximum temperature is chosen whose annealing time is possible of commercial adaptation, preferably those temperatures with annealing times of from fifteen to twenty-five minutes. In practice, as a factor of safety, the annealing time should be lengthened from three to five minutes, to insure against temperature fluctuations.

In the determination of the cooling rate, the initial cooling must be slow, since the lost motion is a function of the temperature and the rate of cooling. The amount of lost motion for identical cooling rates decreases by one-half for every 18 degrees Fahrenheit drop. Therefore, as the temperature lowers, the cooling rate may be increased, even within the annealing range, without increasing the amount of lost motion. Regard should also be paid to the maximum thickness of the glass, since the stress is directly proportioned to the square of the thickness for unit gradient or lost motion.

Since the process is to be commercially applied in an electric lehr, the number of changes in the cooling rate should be governed by the number of sections economically possible of cooling, either three or four. The length of time for cooling at a constant rate is determined by the length of the heating element section, and the speed of the conveyor within the lehr.

In and by the present process, a glass article can be completely annealed from every possible degree and variety of stress and strain at a high temperature, and then by re-annealing at a lower temperature the stress imparted during the drop in temperature can be safely removed at a low temperature and the time of cooling considerably shortened.

In all known processes heretofore used, it was impossible to handle different weights and sizes of glass articles without changing the annealing cycle. In other words, a curve designed for small ware would not anneal the larger sizes. The process here set forth will correctly anneal articles of any size or weight without change, provided only that the glass be of the same chemical and physical nature.

My process provides a factor of safety and uniformity hitherto unobtainable in commercial practice.

Finally, the process naturally economizes both space and time. This is particularly emphasized in the treatment of the larger sizes of glass ware. For example, the five-gallon bottle already cited is perfectly and certainly annealed and ready for packing in three hours, whereas no less than twelve hours has been necessary for the imperfect annealing hitherto attained in lehrs, and in the case of ovens three to four days were required.

The present method differs from that disclosed in my Patent Number 1,540,264, issued June 2, 1925, in that the former contemplated partial removal of stress and strain at annealing temperatures and neutralizing the remaining stresses and strains by the cooling curve or gradient; whereas in the present method all stresses and strains are removed at high annealing temperatures, whereupon the temperature is suddenly lowered and re-annealing carried on at this lower temperature.

What I claim as new and desire to secure by Letters Patent is:

1. In a process of annealing glass articles in a temperature-controlled lehr or muffle, the steps of subjecting the glass-ware to a plurality of annealing stages, first at a high temperature and thereafter at a lower temperature, all within the annealing range.

2. In a process of annealing glass articles in a temperature-controlled lehr or muffle, the steps of subjecting the glass-ware to uniform temperature for a relatively short time within the upper reaches of the annealing range, lowering the temperature a substantial amount with appreciable rapidity, and re-annealing at said reduced temperature.

3. In a process for the annealing of glass articles in a temperature-controlled lehr or muffle, the steps of first annealing at a relatively high temperature, rapidly reducing the temperature to a point still within the annealing temperature, and re-annealing at such lower temperature, and thereafter continuously reducing the temperature to a point below the annealing range.

4. A process of annealing glass articles in a lehr or the like, which consists in first bringing the glass-ware to a temperature sufficiently high to cause removal of all stresses in the most economical time, lowering the temperature a substantial amount as rapidly as possible, maintaining this lowered temperature for a period of time sufficient to remove any reverse strains imparted during the rapid fall of the temperature, and thereafter continuously and with progressively increasing rapidity lowering the temperature to a point below the lower limit of the annealing range.

5. A process of annealing glass articles in a lehr or the like, which consists in bringing the glass-ware to a temperature within the upper reaches of the annealing range, maintaining this temperature for a time sufficiently long to remove all stresses, then rapidly lowering the temperature to a point still within the annealing range, maintaining this reduced temperature for a time sufficiently long to remove all reverse strains caused by the sudden fall of temperature, and thereafter continuously and with progressively increasing rapidity, lowering the temperature to a point below the annealing range.

6. A process of annealing glass articles in a lehr or the like, which consists in first bringing the articles to a temperature bordering on the upper limits of the plastic and the lower limits of the viscous state of that particular glass, maintaining this temperature sufficiently long to remove all stresses, lowering the temperature with appreciable rapidity to a point within the annealing range, maintaining this lowered temperature for a time sufficiently long to cause all reverse stress imparted by the sudden fall of temperature to be removed, and thereafter reducing the temperature with progressively increasing rapidity to a point below the annealing range.

7. A process of annealing glass articles in a lehr or the like, which consists of first bringing the glass-ware to a temperature of approximately 930 degrees Fahrenheit, maintaining this temperature for a period of approximately twelve minutes, lowering the temperature rapidly to approximately 875 degrees Fahrenheit, maintaining this latter temperature for a period of approximately fifteen minutes. and thereafter reducing the temperature at approximately the following rates: 2 degrees per minute for twenty minutes; 5 degrees per minute for the next seventeen minutes; and 10 degrees per minute for the ensuing twenty-five minutes.

KENNETH M. HENRY.